(12) United States Patent
Moller

(10) Patent No.: US 11,399,009 B2
(45) Date of Patent: Jul. 26, 2022

(54) ENDPOINT CONTEXT AGENT TRAVERSAL OF NETWORK ADDRESS TABLE

(71) Applicant: Forcepoint LLC, Austin, TX (US)

(72) Inventor: Jaakko Moller, Helsinki (FI)

(73) Assignee: Forcepoint LLC, Austin, TX (US)

( * ) Notice: Subject to any disclaimer, the term of this patent is extended or adjusted under 35 U.S.C. 154(b) by 119 days.

(21) Appl. No.: 16/686,694

(22) Filed: Nov. 18, 2019

(65) Prior Publication Data
US 2021/0152519 A1    May 20, 2021

(51) Int. Cl.
*H04L 9/40* (2022.01)
*H04L 41/0226* (2022.01)
*H04L 61/2521* (2022.01)
*H04L 61/256* (2022.01)

(52) U.S. Cl.
CPC .......... *H04L 63/0227* (2013.01); *H04L 63/02* (2013.01); *H04L 29/12405* (2013.01); *H04L 29/12518* (2013.01); *H04L 41/0226* (2013.01); *H04L 63/1408* (2013.01)

(58) Field of Classification Search
CPC .......... H04L 63/0227; H04L 63/02; H04L 29/12518; H04L 29/12405; H04L 41/0226; H04L 63/1408; H04L 63/029
See application file for complete search history.

(56) References Cited

U.S. PATENT DOCUMENTS

| | | | | |
|---|---|---|---|---|
| 6,768,738 B1* | 7/2004 | Yazaki | .................... | H04L 12/46 370/392 |
| 8,289,968 B1* | 10/2012 | Zhuang | ............... | H04L 61/2532 370/392 |
| 2003/0076830 A1* | 4/2003 | Asano | ................. | H04L 29/1233 370/392 |
| 2008/0028077 A1* | 1/2008 | Kamata | ............... | H04L 12/4641 709/227 |
| 2012/0295664 A1* | 11/2012 | Walker | .................. | H04W 12/06 455/561 |
| 2013/0272310 A1* | 10/2013 | Suzuki | .................... | H04L 45/42 370/392 |
| 2018/0041425 A1* | 2/2018 | Zhang | .................... | H04W 76/11 |

* cited by examiner

*Primary Examiner* — Huan V Doan
(74) *Attorney, Agent, or Firm* — Jackson Walker L.L.P.

(57) ABSTRACT

A method, system, and computer-usable medium are disclosed for: (i) communicating, from a client device to a security device via a metadata connection, metadata regarding a data connection to be established by the client device, the metadata comprising a connection identifier uniquely identifying the data connection; and (ii) communicating, from the client device to the security device via the data connection, network traffic comprising a packet that includes the connection identifier, such that the security device may use the connection identifier to index an entry associated with the metadata that the security device has stored in a metadata cache.

15 Claims, 3 Drawing Sheets

ENDPOINT CONTEXT AGENT TRAVERSAL OF NETWORK ADDRESS TABLE

FIELD OF DISCLOSURE

The present invention relates in general to the field of computers and similar technologies, and in particular to software utilized in this field. Still more particularly, it relates to a method, system, and computer-usable medium for performing Endpoint Context Agent traversal of a Network Address Table.

BACKGROUND

While network communication among networked computers, including the use of the Internet, has many advantages, one downside to network communication is that it may render networked computers susceptible to malicious attacks from viruses or other intrusions. Accordingly, network firewalls often analyze information regarding network connections, including information about a user and/or executable program that initiated the connection from the client device.

One mechanism often used by firewalls is Endpoint Connection Agent (ECA). With ECA, an ECA client of a client endpoint device communicates ECA metadata with information about the executable program initiating the connection and the user initiating the connection, along with the 5-tuple (e.g., source address, source port number, destination address, destination port number, protocol in use) of the connection, for matching against the connection. Such metadata may be communicated via a sideband channel other than the communication channel in which the connection is maintained. The client outbound connection may be delayed until the firewall returns a message to the client endpoint device that it has received and cached the metadata. Once the connection reaches the firewall, the firewall may search its metadata cache using the 5-tuple of the received connection.

However, an existing disadvantage to ECA is that the existing standard for ECA does not support the use of Network Address Tables (NATs). As known in the art, a NAT within an internal network may change the 5-tuple within network packets of a connection. Accordingly, when network traffic reaches the firewall, the 5-tuple of the connection may no longer match the 5-tuple set forth in the metadata for the connection, leaving the firewall unable to match the network traffic to a corresponding entry in its metadata cache. Accordingly, approaches are desired to enable ECA functionality in the presence of NATs within an internal network.

SUMMARY

In accordance with the teachings of the present disclosure, certain disadvantages and problems associated with existing approaches to network and data security have been reduced or eliminated.

In accordance with embodiments of the present disclosure, a computer-implementable method for managing network communication may include: (i) communicating, from a client device to a security device via a metadata connection, metadata regarding a data connection to be established by the client device, the metadata comprising a connection identifier uniquely identifying the data connection; and (ii) communicating, from the client device to the security device via the data connection, network traffic comprising a packet that includes the connection identifier, such that the security device may use the connection identifier to index an entry associated with the metadata that the security device has stored in a metadata cache.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured for: (i) communicating, from a client device to a security device via a metadata connection, metadata regarding a data connection to be established by the client device, the metadata comprising a connection identifier uniquely identifying the data connection; and (ii) communicating, from the client device to the security device via the data connection, network traffic comprising a packet that includes the connection identifier, such that the security device may use the connection identifier to index an entry associated with the metadata that the security device has stored in a metadata cache.

In accordance with these and other embodiments of the present disclosure, a non-transitory, computer-readable storage medium may embody computer program code, the computer program code comprising computer executable instructions configured for: (i) communicating, from a client device to a security device via a metadata connection, metadata regarding a data connection to be established by the client device, the metadata comprising a connection identifier uniquely identifying the data connection; and (ii) communicating, from the client device to the security device via the data connection, network traffic comprising a packet that includes the connection identifier, such that the security device may use the connection identifier to index an entry associated with the metadata that the security device has stored in a metadata cache.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
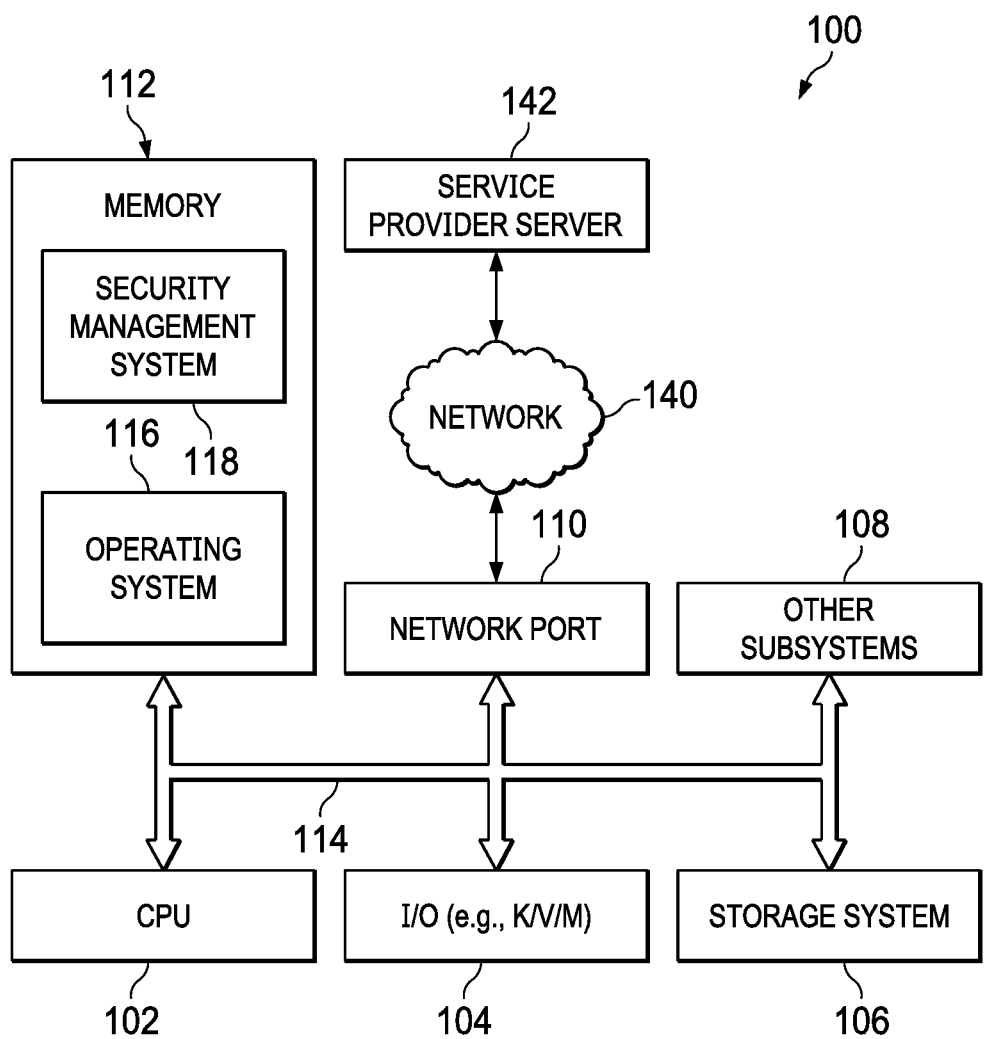
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a security management system 118. In some embodiments, information handling system 100 may be able to download security management system 118 from service provider server 142. In other embodiments, security management system 118 may be provided as a service from the service provider server 142.

In various embodiments, security management system 118 may be configured to enable Endpoint Context Agent traversal of a Network Address Table, as described in greater detail below. In some embodiments, security management system 118 and the functionality thereof may improve processor efficiency, and thus the efficiency of information handling system 100, by performing network security operations with greater efficiency and with decreased processing resources as compared to existing approaches for similar network security operations. In these and other embodiments, security management system 118 and the functionality thereof may improve effectiveness in ensuring network security, and thus the effectiveness of information handling system 100, by performing network security operations with greater effectiveness as compared to existing approaches for similar network security operations. As will be appreciated, once information handling system 100 is configured to perform the functionality of security management system 118, information handling system 100 becomes a specialized computing device specifically configured to perform the functionality of security management system 118, and is not a general purpose computing device. Moreover, the implementation of functionality of security management system 118 on information handling system 100 may improve the functionality of information handling system 100 and provide a useful and concrete result of improving network security and performing network security operations with greater efficiency and with decreased processing resources.

Figure 2:
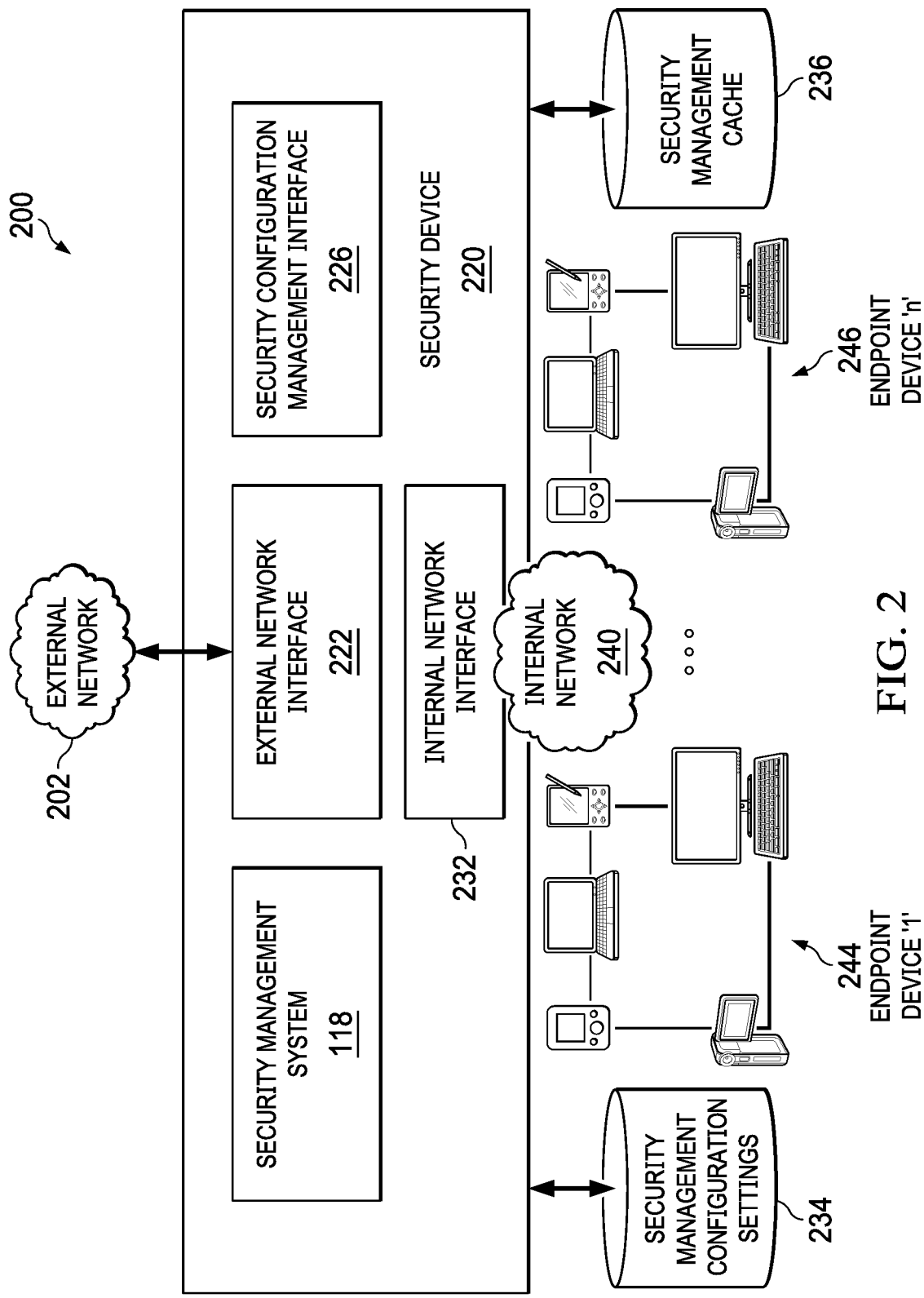
FIG. 2 illustrates a block diagram of a system for performing Endpoint Context Agent traversal of a Network Address Table, in accordance with embodiments of the present disclosure.

FIG. 2 illustrates a block diagram of a system 200 for performing Endpoint Context Agent traversal of a Network Address Table, in accordance with embodiments of the present disclosure. In some embodiments, a security device 220 may include an external network interface 222, a security configuration management interface 226, an internal network interface 232, and a security management system 118. Security device 220 may be implemented using any suitable information handling system 100, including without limitation a gateway, a firewall, an intrusion prevention system, an intrusion detection system, or any other suitable security device capable of implementing security management system 118. In some embodiments, security device 220 may be implemented as an individual security device 220, a virtual context security device 220, or a security device 220 cluster.

Security device 220 may also include in some embodiments a repository of security management configuration settings 234 and a security management cache 236. In certain embodiments, security configuration management interface 226 may be implemented to receive instructions relating to network security policy decisions from security management system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

Embodiments of the invention may reflect an appreciation that network communication may represent an efficient means for communicating useful information. However, those of skill in the art will likewise appreciate that it may be desirable to secure such network communication to prevent malicious attacks on network components. Many existing solutions for providing security in a network environment have disadvantages, as described in the Background section of this application. However, security management system 118 as disclosed herein may overcome these disadvantages by enabling Endpoint Context Agent traversal of a Network Address Table, as described herein.

Figure 3:
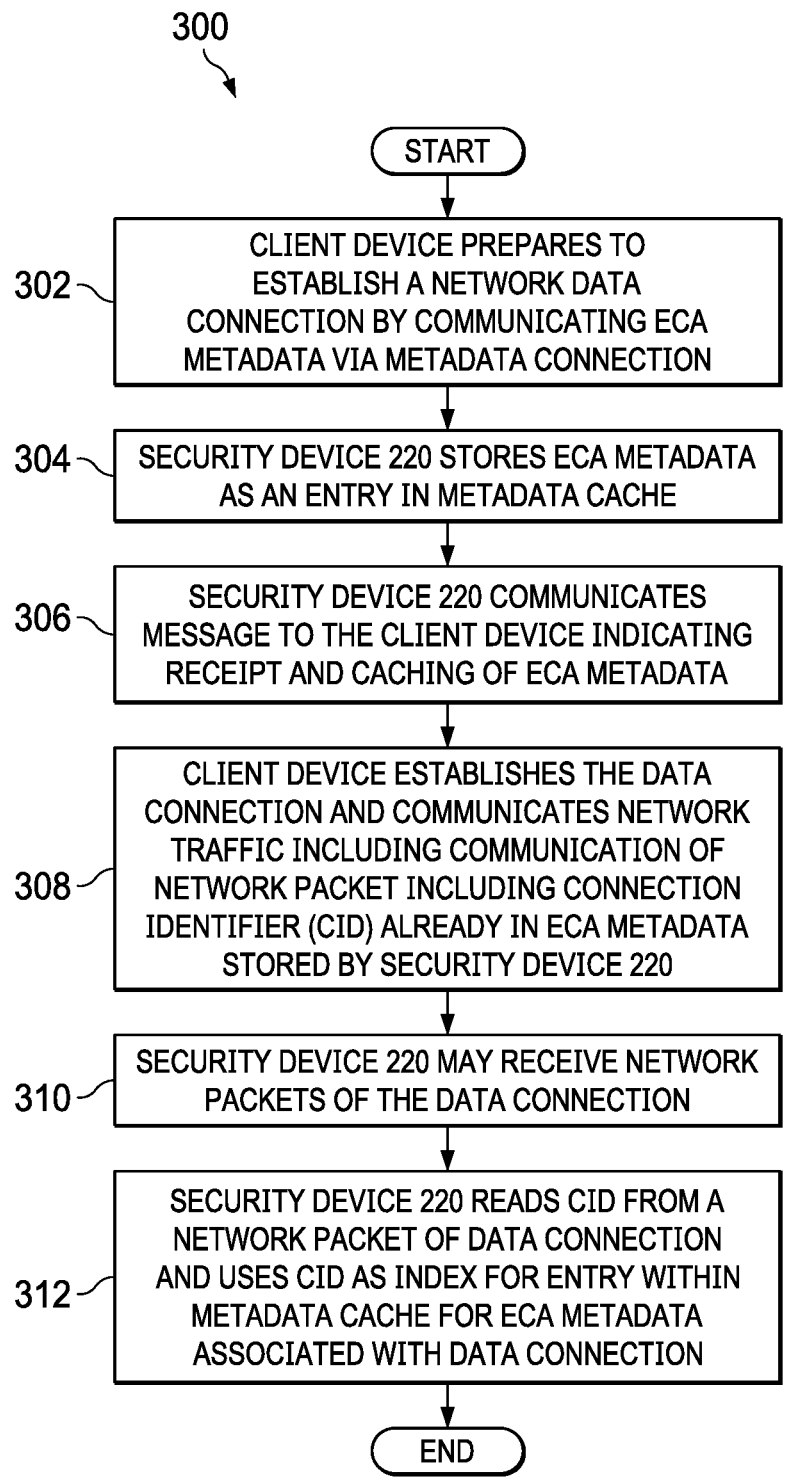
FIG. 3 illustrates a flow chart of an example method for performing Endpoint Context Agent traversal of a Network Address Table, in accordance with embodiments of the present disclosure.

FIG. 3 illustrates a flow chart of an example method 300 for performing Endpoint Context Agent traversal of a Network Address Table, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, a client device (e.g., an endpoint device 244, 246) may prepare to establish a network data connection by communicating ECA metadata via internal network 240, which may be received by security device 220 Such communication of ECA metadata may be from a side channel isolated from that which the network data connection is to be established. At step 304, upon receipt of the ECA metadata for the connection, security device 220 may store the ECA metadata as an entry in a metadata cache (e.g., within security management cache 236). At step 306, security device 220 may communicate a message (e.g., via the side channel connection) to the client device indicating receipt and caching of the ECA metadata for the connection by security device 220.

At step 308, responsive to receipt of the message from security device 220 indicating receipt and caching of the ECA metadata for the connection by security device 220, the client device may establish the data connection and begin communicating network traffic (e.g., Transport Communication Protocol (TCP) packets or User Datagram Protocol (UDP) packets) via the data connection. However, prior to communicating the first network packet of the data connection, the client device may insert into the first network packet of the data connection a connection identifier (CID) already present in the ECA metadata that the client device communicated to security device 220 at step 302. In some embodiments, the client device may also insert a metadata connection identifier (MCID) that uniquely identifies the side channel metadata connection into the first network packet of the connection, in order that CIDs between different client devices do not clash. In these and other embodiments, the CID and/or MCID may be inserted into a custom TCP/UDP header within the first packet of the data connection.

At step 310, security device 220 may receive the first network packet of the data connection. At step 312, security device 220 may read the CID and MCID from the first network packet and use the CID and MCID as an index for an entry within the metadata cache for the ECA metadata associated with the data connection.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using CPU 102, security management system 118 executing thereon, and/or any other system operable to implement method 300. In certain embodiments, method 300 may be implemented partially or fully in software and/or firmware embodied in computer-readable media.

Using the systems and methods disclosed above, a security device may be able to execute ECA even in the presence of a NAT within its internal network. In addition, a security device may also be able to match connections outside its internal network, and reside at the edge of a network cloud to control policies for users outside its internal network.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A computer-implemented method for managing network communication, comprising:
    communicating, from a client device to a security device via a metadata connection, metadata regarding a data connection to be established by the client device, the metadata comprising a connection identifier uniquely identifying the data connection; and
    communicating, from the client device to the security device via the data connection, network traffic comprising a packet that includes the connection identifier, such that the security device is operable to use the connection identifier to index an entry associated with the metadata that the security device has stored in a metadata cache;
    wherein the metadata connection is a side channel isolated from the data connection, and wherein prior to communicating the packet, the client device is configured to insert, into a header of the packet, the connection identifier and a metadata connection identifier that uniquely identifies the side channel.

2. The method of claim 1, wherein the packet that includes the connection identifier is an initial packet communicated from the client device as part of the network traffic.

3. The method of claim 1, wherein the connection identifier is part of a custom header of the packet that includes the connection identifier.

4. The method of claim 1, wherein the network traffic is communicated in response to a message from the security device to the client device indicating the security device has received the metadata.

5. The method of claim 1, wherein the metadata comprises Endpoint Context Agent metadata.

6. A system comprising:
    a processor; and
    a non-transitory, computer-readable storage medium comprising instructions executable by the processor and configured for:
        communicating, from a client device to a security device via a metadata connection, metadata regarding a data connection to be established by the client device, the metadata comprising a connection identifier uniquely identifying the data connection; and
        communicating, from the client device to the security device via the data connection, network traffic comprising a packet that includes the connection identifier, such that the security device is operable to use the connection identifier to index an entry associated with the metadata that the security device has stored in a metadata cache;
        wherein the metadata connection is a side channel isolated from the data connection, and wherein prior to communicating the packet, the client device is configured to insert, into a header of the packet, the connection identifier and a metadata connection identifier that uniquely identifies the side channel.

7. The system of claim 6, wherein the packet that includes the connection identifier is an initial packet communicated from the client device as part of the network traffic.

8. The system of claim 6, wherein the connection identifier is part of a custom header of the packet that includes the connection identifier.

9. The system of claim 6, wherein the network traffic is communicated in response to a message from the security device to the client device indicating the security device has received the metadata.

10. The system of claim 6, wherein the metadata comprises Endpoint Context Agent metadata.

11. A non-transitory, computer-readable storage medium embodying computer program code, the computer program code comprising computer executable instructions configured for:
    communicating, from a client device to a security device via a metadata connection, metadata regarding a data connection to be established by the client device, the metadata comprising a connection identifier uniquely identifying the data connection; and
    communicating, from the client device to the security device via the data connection, network traffic comprising a packet that includes the connection identifier, such that the security device is operable to use the connection identifier to index an entry associated with the metadata that the security device has stored in a metadata cache;
    wherein the metadata connection is a side channel isolated from the data connection, and wherein prior to communicating the packet, the client device is configured to insert, into a header of the packet, the connection identifier and a metadata connection identifier that uniquely identifies the side channel.

12. The storage medium of claim 11, wherein the packet that includes the connection identifier is an initial packet communicated from the client device as part of the network traffic.

13. The storage medium of claim 11, wherein the connection identifier is part of a custom header of the packet that includes the connection identifier.

14. The storage medium of claim 11, wherein the network traffic is communicated in response to a message from the security device to the client device indicating the security device has received the metadata.

15. The storage medium of claim 11, wherein the metadata comprises Endpoint Context Agent metadata.

* * * * *